(12) United States Patent
Mashiki

(10) Patent No.: US 9,670,866 B2
(45) Date of Patent: Jun. 6, 2017

(54) CONTROL DEVICE AND CONTROL METHOD FOR INTERNAL COMBUSTION ENGINE

(71) Applicant: Zenichiro Mashiki, Nisshin (JP)

(72) Inventor: Zenichiro Mashiki, Nisshin (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 59 days.

(21) Appl. No.: 14/416,522

(22) PCT Filed: Oct. 14, 2013

(86) PCT No.: PCT/IB2013/002282
§ 371 (c)(1),
(2) Date: Jan. 22, 2015

(87) PCT Pub. No.: WO2014/060818
PCT Pub. Date: Apr. 24, 2014

(65) Prior Publication Data
US 2015/0267634 A1   Sep. 24, 2015

(30) Foreign Application Priority Data

Oct. 16, 2012   (JP) .................................. 2012-229025

(51) Int. Cl.
*F02D 41/30*   (2006.01)
*F02D 41/00*   (2006.01)
(Continued)

(52) U.S. Cl.
CPC ..... *F02D 41/3094* (2013.01); *F02D 13/0276* (2013.01); *F02D 41/005* (2013.01);
(Continued)

(58) Field of Classification Search
CPC ............. F02D 41/3094; F02D 13/0276; F02D 41/0057; F02D 41/3029; F02D 41/005; F02D 41/3076; F02M 61/145; Y02T 10/47
(Continued)

(56) References Cited

U.S. PATENT DOCUMENTS 5,291,673 A * 3/1994 Hamburg ............ F02D 41/1494
123/697
5,404,718 A * 4/1995 Orzel .................... F01N 11/007
123/674
(Continued)

FOREIGN PATENT DOCUMENTS

JP   7-269416 A   10/1995
JP   2003 129923   5/2003
(Continued)

OTHER PUBLICATIONS

International Search Report Issued May 6, 2014 in PCT/IB13/002282 Filed Oct. 14, 2013.

*Primary Examiner* — Joseph Dallo
(74) *Attorney, Agent, or Firm* — Oblon, McClelland, Maier & Neustadt, L.L.P.

(57) ABSTRACT

A control device for an internal combustion engine includes: an EGR control unit executing open/close control over an EGR valve on the basis of an operating state of the engine; and a fuel injection control unit carrying out at least one of port injection and in-cylinder direct injection by operating at least one of a port injection injector and an in-cylinder direct injection injector on the basis of the engine operating state. The fuel injection control unit sets an EGR non-operation in-cylinder direct injection region, in which the port injection is stopped and the in-cylinder direct injection is carried out while the EGR valve is closed, within an operation range of the engine, and sets part of an EGR operation port
(Continued)

injection permissible region, in which at least the port injection is carried out while the EGR valve is open, within the EGR non-operation in-cylinder direct injection region.

8 Claims, 5 Drawing Sheets

(51) Int. Cl.
*F02D 13/02* (2006.01)
*F02M 61/14* (2006.01)

(52) U.S. Cl.
CPC ..... *F02D 41/0057* (2013.01); *F02D 41/3029* (2013.01); *F02D 41/3076* (2013.01); *F02M 61/145* (2013.01); *Y02T 10/47* (2013.01)

(58) Field of Classification Search
USPC ............ 123/568.11–568.29, 294–299; 701/102–105
See application file for complete search history.

(56) References Cited

U.S. PATENT DOCUMENTS

| | | | | |
|---|---|---|---|---|
| 5,616,835 | A * | 4/1997 | Schnaibel | F02D 41/1494 123/697 |
| 6,269,634 | B1 * | 8/2001 | Yokota | F01N 3/0842 123/300 |
| 6,304,813 | B1 * | 10/2001 | Ikeda | F02D 41/1494 123/697 |
| 6,848,439 | B2 * | 2/2005 | Ohkuma | F02D 41/0042 123/688 |
| 7,128,053 | B2 * | 10/2006 | Tokuda | F02D 41/061 123/429 |
| 7,270,112 | B2 * | 9/2007 | Kinose | F02D 41/3094 123/406.47 |
| 7,493,893 | B2 * | 2/2009 | Funabashi | F02D 33/006 123/457 |
| 8,005,608 | B2 * | 8/2011 | Morita | F02D 41/064 123/295 |
| 8,146,568 | B2 * | 4/2012 | Cohn | F02B 47/04 123/198 A |
| 8,739,760 | B2 * | 6/2014 | Hokuto | F02D 41/0057 123/299 |
| 9,188,076 | B2 * | 11/2015 | Kai | F02D 41/30 |
| 9,243,575 | B2 * | 1/2016 | Ando | F02D 41/025 |
| 9,255,541 | B2 * | 2/2016 | Surnilla | F02D 41/3094 |
| 9,297,329 | B2 * | 3/2016 | Surnilla | F02D 41/3094 |
| 9,303,577 | B2 * | 4/2016 | Surnilla | F02D 41/062 |
| 2003/0051707 | A1 | 3/2003 | Pilgram et al. | |
| 2005/0016513 | A1 * | 1/2005 | Ohkuma | F02D 41/1494 123/681 |
| 2005/0109320 | A1 * | 5/2005 | Mashiki | F02D 41/008 123/431 |
| 2006/0016430 | A1 * | 1/2006 | Sadakane | F02D 41/064 123/431 |
| 2006/0021595 | A1 * | 2/2006 | Miyashita | F02P 5/1502 123/299 |
| 2006/0096577 | A1 * | 5/2006 | Araki | F02D 41/30 123/431 |
| 2006/0107650 | A1 * | 5/2006 | Tokuda | F02D 41/3029 60/284 |
| 2007/0017484 | A1 | 1/2007 | Kinose | |
| 2007/0169464 | A1 * | 7/2007 | Saito | F02D 41/1494 60/276 |
| 2015/0144116 | A1 * | 5/2015 | Anzawa | F02D 41/3094 123/676 |

FOREIGN PATENT DOCUMENTS

| | | |
|---|---|---|
| JP | 2006 226163 | 8/2006 |
| JP | 2007 32315 | 2/2007 |
| JP | 2010 24951 | 2/2010 |
| JP | 2010 169038 | 8/2010 |
| JP | 2010 270615 | 12/2010 |
| JP | 2011 140902 | 7/2011 |
| JP | 2011 247156 | 12/2011 |

\* cited by examiner

CONTROL DEVICE AND CONTROL METHOD FOR INTERNAL COMBUSTION ENGINE

BACKGROUND OF THE INVENTION

1. Field of the Invention

The invention relates to a control device and control method for an internal combustion engine and, more particularly, to a control device and control method for an internal combustion engine, which execute fuel injection control over the internal combustion engine that uses both port injection and in-cylinder direct injection.

2. Description of Related Art

There is a multicylinder internal combustion engine (hereinafter, referred to as engine) that is mounted on a vehicle and that is of a dual injection type in which both port injection injectors and in-cylinder direct injection injectors are provided. The engine of this type is equipped with a fuel injection control device that is able, to control port injection (fuel injection into ports) and in-cylinder direct injection (direct fuel injection into cylinders) with the use of both types of injectors.

There is such a control device for an internal combustion engine, which, for example, switches among port injection, in-cylinder direct injection and dual injection that uses both port injection and in-cylinder direct injection on the basis of an operating state of the engine (for example, see paragraph 0064 in Japanese Patent Application Publication No. 2010-169038 (JP 2010-169038 A)).

In addition, there is also such a control device for an internal combustion engine, which suppresses clogging of fuel injectors at the time when the amount of EGR gas is reduced by an EGR device by variably controlling the ratio of fuel injection amounts (injection distribution ratio) through both fuel injections while both port injection and in-cylinder direct injection are being carried out (for example, see paragraphs 0008 to 0009 in Japanese Patent Application Publication No. 2010-024951 (JP 2010-024951 A)).

SUMMARY OF THE INVENTION

However, with the above-described control devices for an internal combustion engine, if the EGR device operates in an operating state where port injection is not carried out and only in-cylinder direct injection is carried out, the temperature around injection holes of port injection injectors exposed to the inside of an intake passage rises, possibly leading to occurrence of a state where a deposit is easily produced at the injection holes of the port injection injectors. Therefore, there are concerns about deterioration of exhaust gas purification performance and drivability because, when the state where a deposit is easily produced frequently occurs or the operating state of only in-cylinder direct injection continues for a long time, a fuel injection amount from each of the port injection injectors decreases due to the produced deposit.

The invention provides a control device and control method for an internal combustion engine, which are able to effectively suppress formation of a deposit at an injection hole of a port injection injector irrespective of whether an EGR device operates.

A first aspect of the invention provides a control device for an internal combustion engine. The internal combustion engine includes: an exhaust passage; an intake passage; an EGR passage that connects the exhaust passage to the intake passage; an EGR valve that opens or closes the EGR passage; a port injection injector that carries out port injection in which fuel is injected into the intake passage; and an in-cylinder direct injection injector that carries out in-cylinder direct injection in which fuel is directly injected into a cylinder of the internal combustion engine. The control device includes: an EGR control unit configured to execute open/close control over the EGR valve on the basis of an operating state of the internal combustion engine; and a fuel injection control unit configured to carry out at least one of the port injection and the in-cylinder direct injection by operating at least one of the port injection injector and the in-cylinder direct injection injector on the basis of the operating state of the internal combustion engine. The fuel injection control unit is configured to set an EGR non-operation in-cylinder direct injection region, in which the port injection is stopped and the in-cylinder direct injection is carried out in a state where the EGR valve is closed, within an operation range of the internal combustion engine, and to set part of an EGR operation port injection permissible region, in which at least the port injection is carried out in a state where the EGR valve is open, within the EGR non-operation in-cylinder direct injection region.

In the above aspect, part of the EGR operation port injection permissible region in which at least the port injection is carried out in a state where the EGR valve is open (EGR operation state) is set within the EGR non-operation in-cylinder direct injection region in which the port injection is not carried out and only the in-cylinder direct injection is carried out in a state where the EGR valve is closed (EGR non-operation state). Thus, when the internal combustion engine that has been operated within the EGR non-operation in-cylinder direct injection region shifts into the EGR operation state, fuel injection is carried out with the use of the port injection injector at the timing at which the operating state of the internal combustion engine enters the range of the part of the EGR operation port injection permissible region. Therefore, a portion around an injection hole of the port injection injector is adequately cooled by fuel, the temperature around the injection hole is hard to rise, so occurrence of a state where a deposit is easily produced at the injection hole of the port injection injector is effectively suppressed.

In the above aspect, the EGR control unit may be configured to set an EGR operation region in which the EGR valve is open and an EGR non-operation region in which the EGR valve is closed within the operation range of the internal combustion engine, and the fuel injection control unit may be configured to set the EGR operation port injection permissible region such that at least one of a load factor of the internal combustion engine and an engine rotation speed of the internal combustion engine reaches a wider range than that in the EGR operation region.

With this configuration, when the internal combustion engine shifts into the EGR operation state, the operating state of the internal combustion engine early and easily enters the EGR operation port injection permissible region, so fuel injection is more early carried out with the use of the port injection injector.

In the above configuration, the fuel injection control unit may be configured to set the EGR operation port injection permissible region as an operation region that includes the EGR operation region.

In this case, when the internal combustion engine shifts into the EGR operation state, the operating state of the internal combustion engine reliably and early enters the EGR operation port injection permissible region, so fuel injection is early and reliably carried out with the use of the port injection injector and, therefore, the temperature around the injection hole is further hard to rise.

In the above configuration, the EGR control unit may be configured to set the EGR operation region within a load operation range that exceeds a predetermined load factor of the internal combustion engine at or below which the in-cylinder direct injection and the port injection are permitted to be carried out.

With this configuration, the EGR operation injection distribution region that reaches a wider range than the EGR operation region can be set, and the port injection can be reliably carried out during EGR operation, so it is possible to effectively suppress occurrence of a state where a deposit is easily produced at the injection hole of the port injection injector.

In the above aspect, the EGR operation port injection permissible region may be an EGR operation injection distribution region in which the port injection and the in-cylinder direct injection are carried out in a state where the EGR valve is open.

In this case, even when shifting from the EGR non-operation in-cylinder direct injection state to the EGR operation state, it is not required to significantly change the fuel injection state, so it is possible to suppress a variation in the operating state of the internal combustion engine due to a change of an injection condition.

In the above configuration, the fuel injection control unit may be configured to limit a lower limit value of a fuel injection amount through the port injection in part of the EGR operation injection distribution region to a preset lower limit injection amount.

With this configuration, it is possible to sufficiently ensure the effect of suppressing a deposit by setting the port injection amount in the part of the EGR operation injection distribution region to a minimum injection amount or above. It is possible to cool the injection hole of the port injection injector at or above the minimum injection amount.

In the above configuration, the fuel injection control unit may be configured to set an EGR non-operation injection distribution region, in which the in-cylinder direct injection and the port injection are carried out in a state where the EGR valve is closed, within the operation range of the internal combustion engine in addition to the EGR operation injection distribution region and the EGR non-operation in-cylinder direct injection region, and to set part of the EGR operation injection distribution region such that the part of the EGR operation injection distribution region is extended from the EGR non-operation injection distribution region side to the EGR non-operation in-cylinder direct injection region side.

In this case, it is possible to suppress a variation in the operating state of the internal combustion engine due to a change of the injection distribution region by extending the injection distribution region only for a range effective to avoid a state where a deposit is easily produced at the injection hole of the port injection injector during EGR operation.

A second aspect of the invention provides a control method for an internal combustion engine. The internal combustion engine including: an exhaust passage; an intake passage; an EGR passage that connects the exhaust passage to the intake passage; an EGR valve that opens or closes the EGR passage; a port injection injector that carries out port injection in which fuel is injected into the intake passage; and an in-cylinder direct injection injector that carries out in-cylinder direct injection in which fuel is directly injected into a cylinder of the internal combustion engine. The control method includes: setting an EGR non-operation in-cylinder direct injection region, in which the port injection is stopped and the in-cylinder direct injection is carried out in a state where the EGR valve is closed, within an operation range of the internal combustion engine, and setting part of an EGR operation port injection permissible region, in which at least the port injection is carried out in a state where the EGR valve is open, within the EGR non-operation in-cylinder direct injection region.

According to the above aspect, advantageous effects similar to those of the first aspect are obtained.

According to the above-described aspects, even when the internal combustion engine that has been operated within the EGR non-operation in-cylinder direct injection region shifts into the EGR operation state, but when the operating state of the internal combustion engine enters the operation range of part of the EGR operation port injection permissible region, it is possible to adequately cool a portion around the injection hole of the port injection injector with the use of fuel by causing the port injection injector to carry out fuel injection. As a result, it is possible to effectively suppress formation of a deposit at the injection hole of the port injection injector by making the temperature around the injection hole of the port injection injector hard to rise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 5:
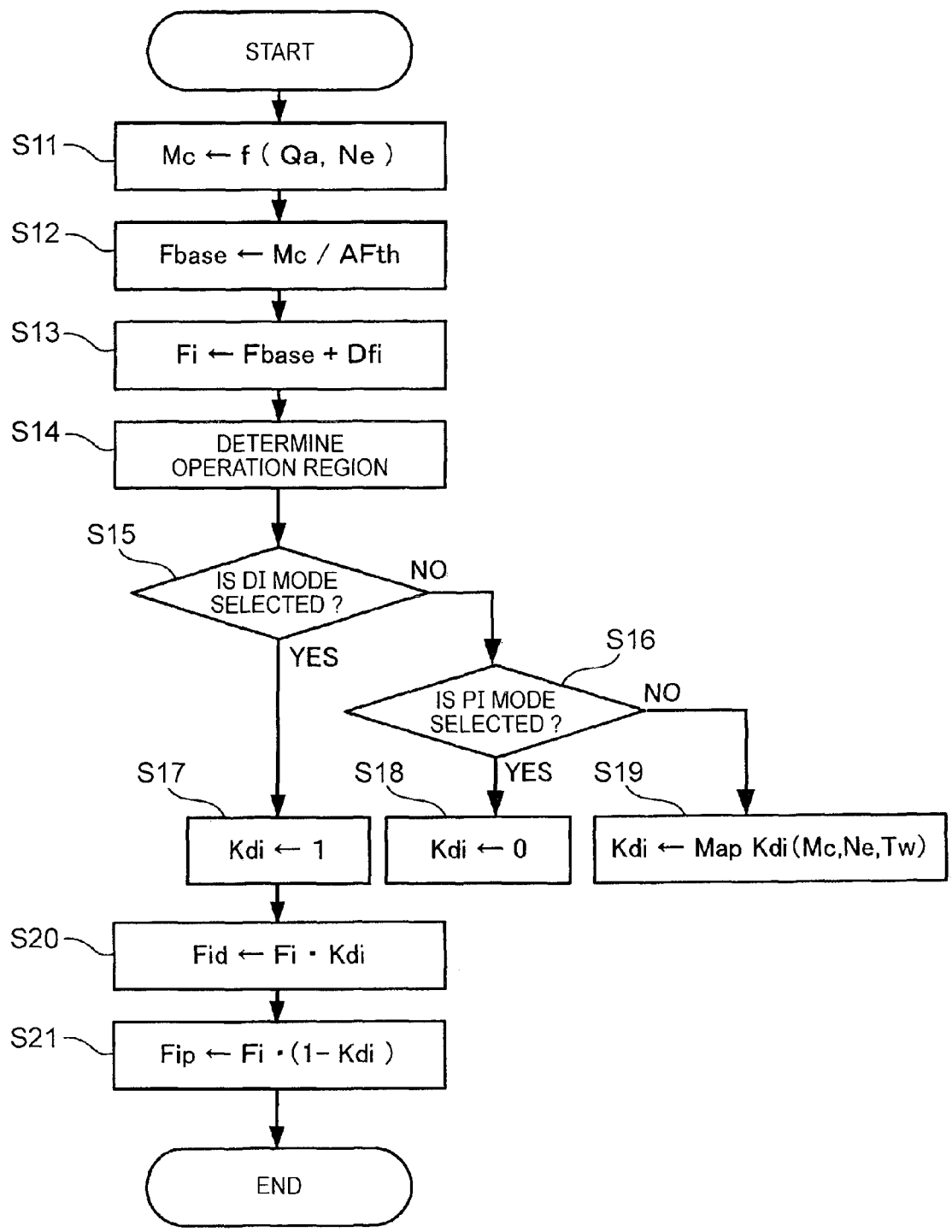
FIG. 5 is a flowchart that shows the schematic flow of an injection amount calculation process that is executed by the control device for the internal combustion engine according to the embodiment of the invention.
Figure 6:
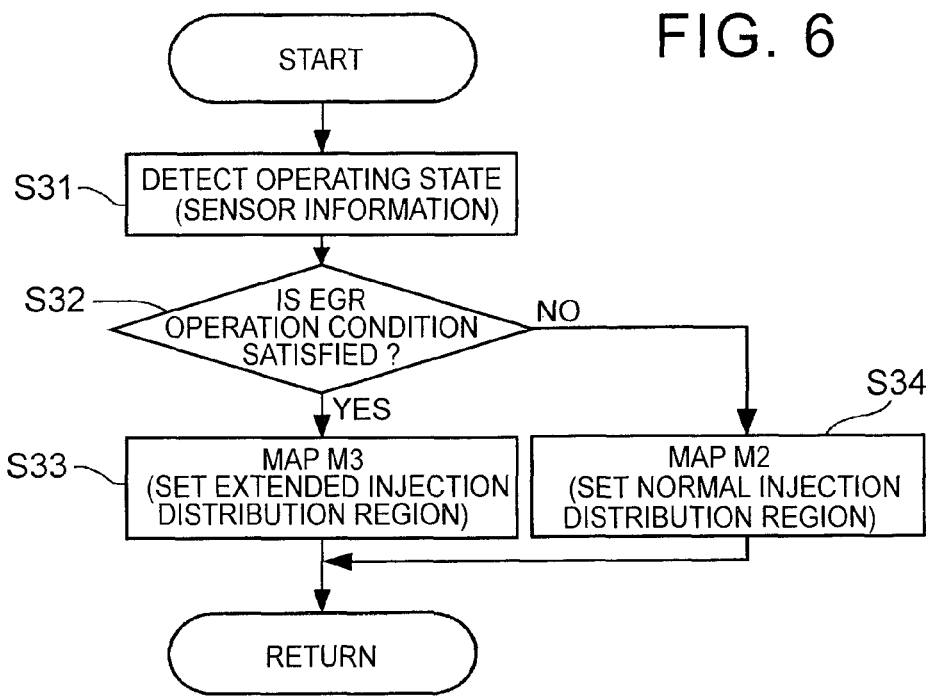
FIG. 6 is a flowchart that shows the procedure of a process of selecting one of two types of maps that are used to determine an operation region of the internal combustion engine in the injection amount calculation process of FIG. 5.
Figure 7:
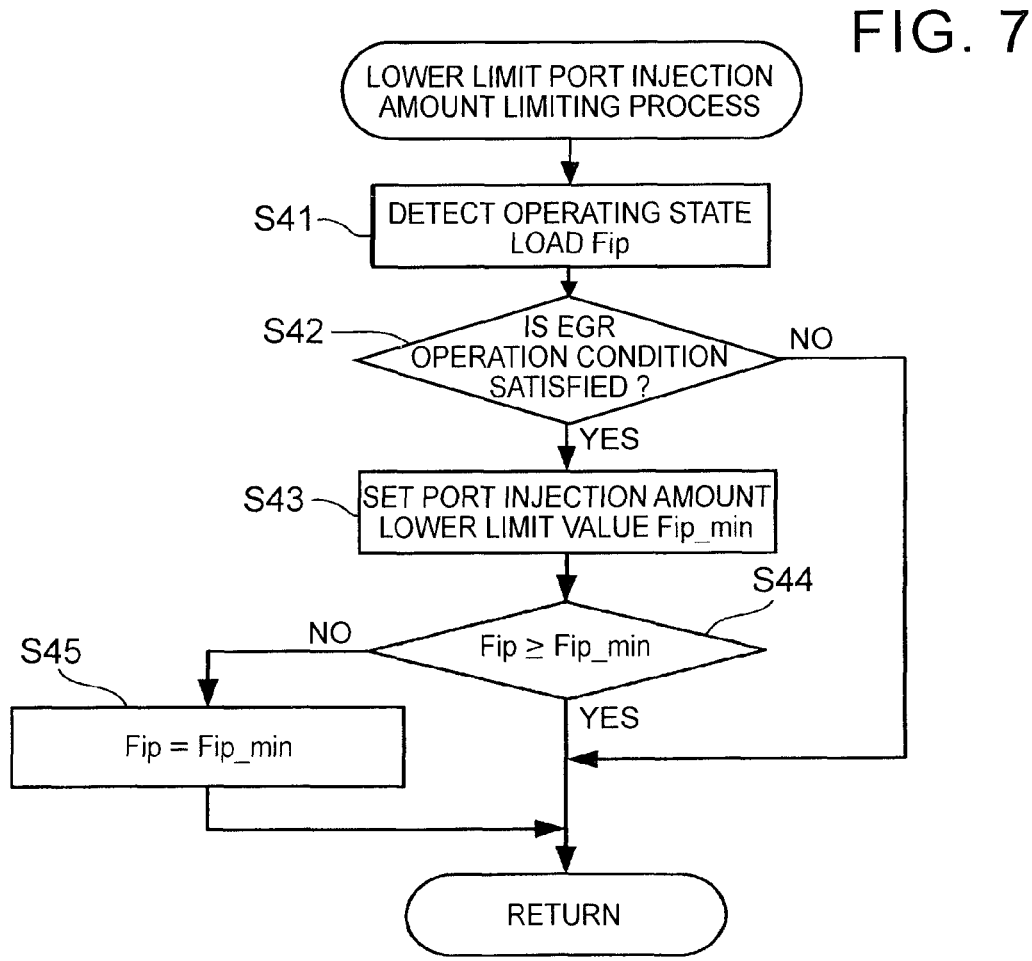
FIG. 7 is a flowchart that shows the schematic procedure of a lower limit port injection amount limiting process within the EGR operation injection distribution region, which is executed by the control device for the internal combustion engine according to the embodiment of the invention.

FIG. 1 to FIG. 4 show the configuration of an internal combustion engine and a control device therefor according to the embodiment of the invention. FIG. 5 to FIG. 7 show the flows of a plurality of control programs that are executed by the control device. The control device for an internal combustion engine according to the present embodiment is equipped for a spark ignition multicylinder internal combustion engine, for example, in-line four-cylinder four-cycle gasoline engine (hereinafter, referred to as engine), mounted on an automobile (vehicle).

First, the configuration will be described.

Figure 1:
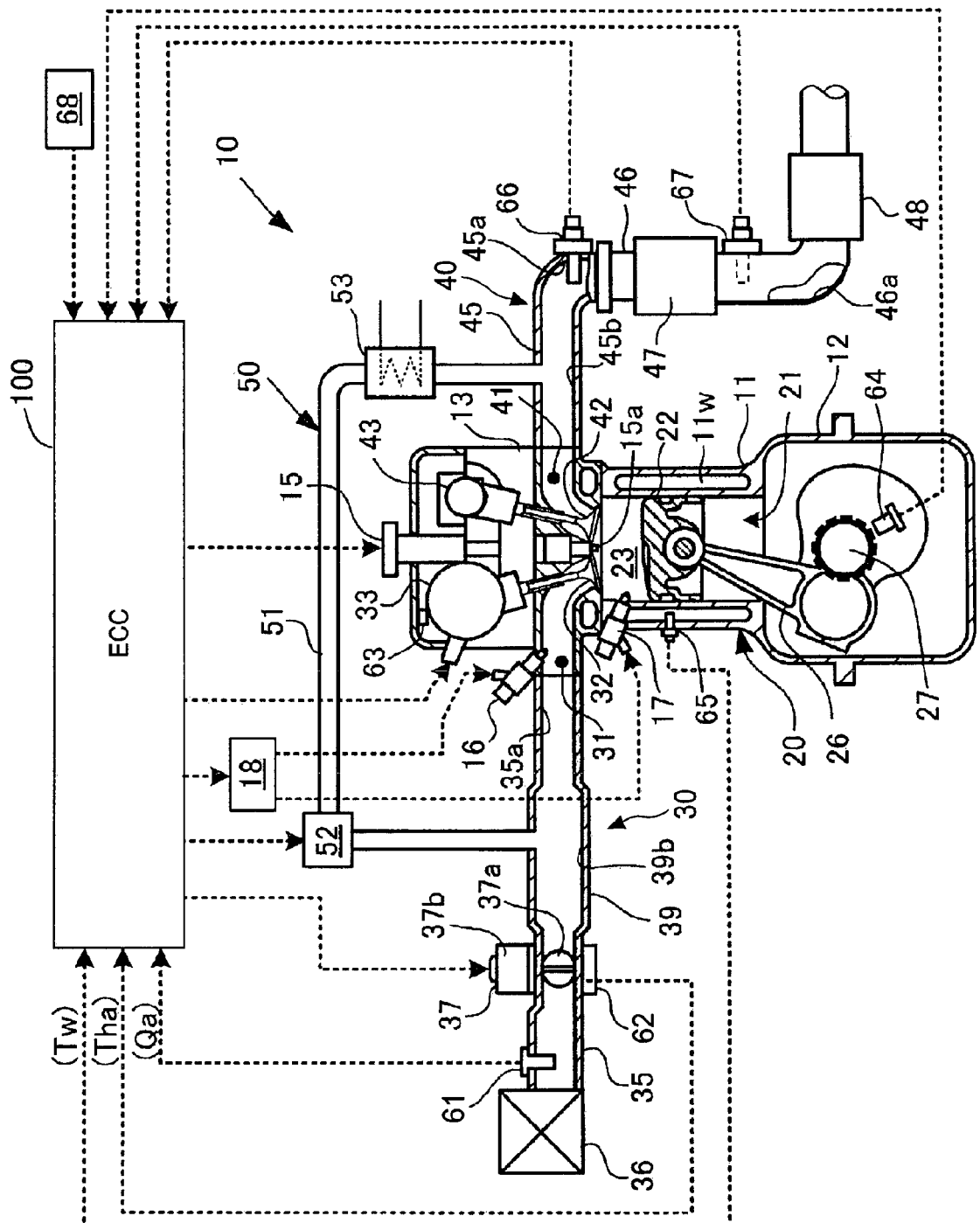
FIG. 1 is a schematic configuration view of an internal combustion engine according to an embodiment of the invention.
Figure 2:
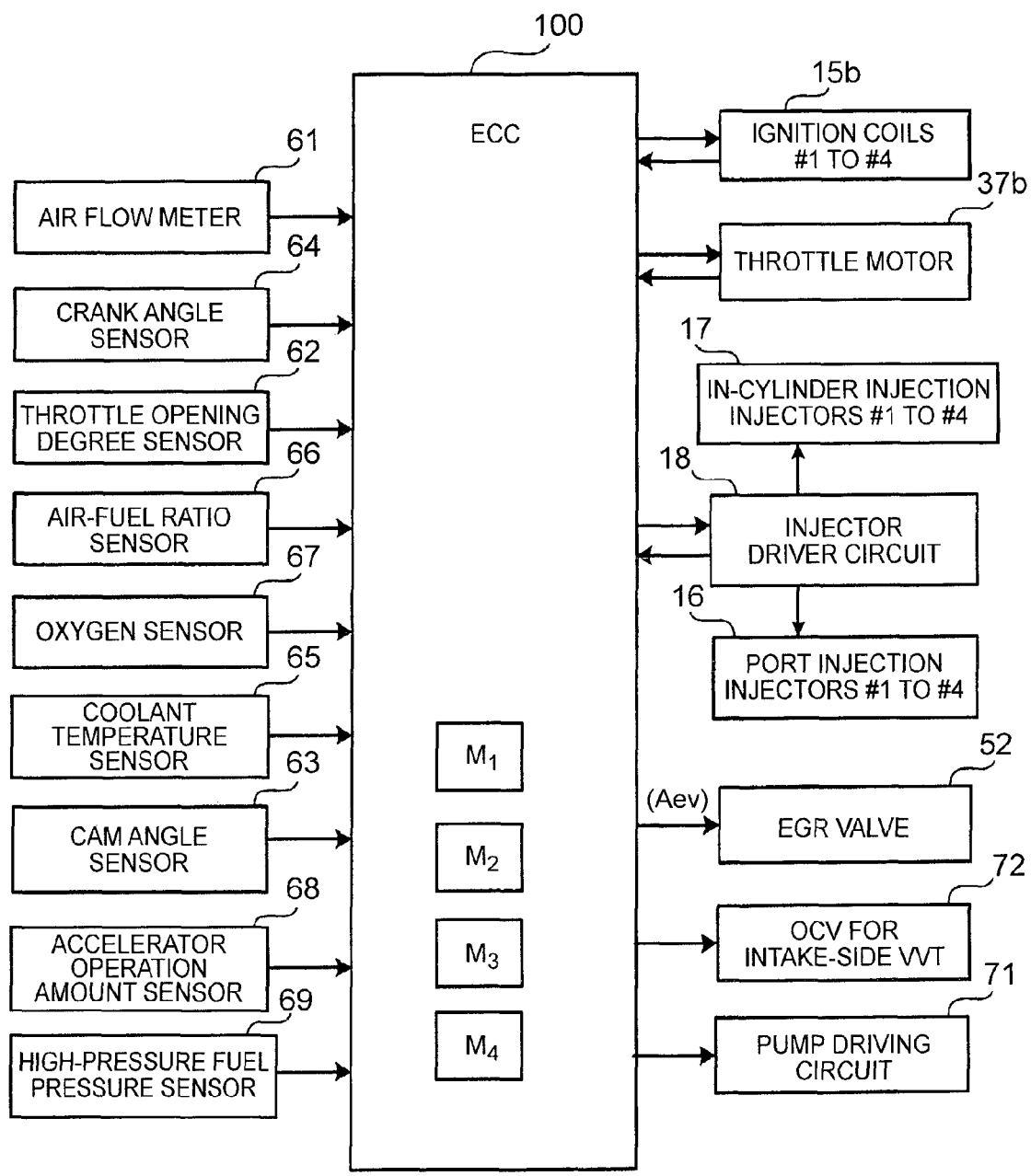
FIG. 2 is a schematic block diagram of a control device for the internal combustion engine according to the embodiment of the invention.

As shown in FIG. 1 and FIG. 2, the control device for an internal combustion engine according to the present embodiment includes an engine 10 that is the internal combustion engine, and has an engine control computer (hereinafter, ECC) 100.

The engine 10 includes a body block 20, an intake device 30, an exhaust device 40 and an exhaust gas recirculation (EGR) device 50. The body block 20 is formed by mounting a crank case 12, a cylinder head 13, and the like, on a cylinder block 11. The intake device 30 and the exhaust device 40 are arranged on both sides of the body block 20. The EGR device 50 forms an exhaust gas return path from the exhaust device 40 side to the intake device 30 side.

The body block 20 accommodates pistons 22 respectively inside a plurality of cylinders 21 such that the pistons 22 are reciprocally movable. The plurality of cylinders 21 are formed in the cylinder block 11. Combustion chambers 23 are respectively formed inside the cylinders 21 of which the upper end sides are closed by the cylinder head 13. The volumes of the combustion chambers 23 vary with reciprocal movement of the corresponding pistons 22. A crankshaft 27 is coupled to the plurality of pistons 22 via a plurality of connecting rods 26. When the plurality of pistons 22 reciprocally move with variations in pressure inside the plurality of combustion chambers 23, the crankshaft 27 is driven for rotation by the plurality of pistons 22 via the connecting rods 26.

The intake device 30 includes a plurality of intake ports 31, intake valves 32, an intake camshaft (not shown) and an intake-side variable valve timing mechanism (hereinafter, referred to as intake-side VVT) 33. The plurality of intake ports 31 are formed in the cylinder head 13 so as to respectively communicate with the plurality of combustion chambers 23. The intake valves 32 open or close the corresponding intake ports 31. The intake camshaft drives the intake valves 32. The intake-side VVT 33 is able to change the valve operation timing of the intake valves 32 with the use of an actuator interposed between the intake camshaft and the intake valves 32.

In addition, the intake device 30 includes an intake manifold 35, an air filter 36 and a throttle valve 37. The intake manifold 35 has intake branch pipe portions (not shown in detail) connected to the intake ports 31 of the cylinders 21. The air filter 36 is provided upstream of the intake manifold 35. The throttle valve 37 opens or closes an intake throttle valve element 37a with the use of a throttle motor 37b. The intake throttle valve element 37a is provided in an intake passage 35a inside the intake manifold 35.

The engine 10 further includes an ignition device 15. The ignition device 15 includes a plurality of ignition plugs 15a and a plurality of ignition coils 15b. The plurality of ignition plugs 15a ignite air-fuel mixture inside the corresponding combustion chambers 23. The plurality of ignition coils 15b generate high voltage that is applied to those ignition plugs 15a.

The engine 10 is provided with a plurality of port injection injectors 16, a plurality of in-cylinder direct injection injectors 17 and an injector driver circuit 18. The plurality of port injection injectors 16 are respectively installed at the plurality of intake ports 31 or the intake branch pipe portions of the intake manifold 35. The plurality of in-cylinder direct injection injectors 17 are respectively installed at the body block 20 for the respective cylinders 21 so as to directly inject fuel into the insides of the combustion chambers 23. The injector driver circuit 18 selectively opens the plurality of port injection injectors 16 and the plurality of in-cylinder direct injection injectors 17 in response to a control signal from the ECC 100.

The plurality of port injection injectors 16 expose corresponding injection holes (no reference numeral is assigned) to the insides of the corresponding intake ports 31. When the plurality of port injection injectors 16 are driven to open by the injector driver circuit 18, the plurality of port injection injectors 16 inject atomized fuel into intake air on the upstream side of the corresponding intake valves 32 inside the corresponding intake ports 31. These plurality of port injection injectors 16 are connected to a delivery pipe (not shown). Fuel pressurized to a feed pressure by a fuel feed pump (not shown) is accumulated and stored in the delivery pipe.

The plurality of in-cylinder direct injection injectors 17 are, for example, high-pressure fuel injection valves, each of which is able to inject fuel into the corresponding cylinder 21 at the last stage of the compression stroke of the engine 10. The plurality of in-cylinder direct injection injectors 17 are connected to a high-pressure delivery pipe (not shown). The high-pressure delivery pipe is connected to a high-pressure fuel pump via a high-pressure fuel line.

The injector driver circuit 18 has a signal conversion circuit that converts a control signal (such as an injector drive signal, a fuel injection request signal and a high-pressure fuel injection amount signal) from the ECC 100 to a high-voltage and large-current drive signal when the injector driver circuit 18 receives the control signal. The injector driver circuit 18 executes drive control over controlled ones of the port injection injectors 16 and the in-cylinder direct injection injectors 17, corresponding to the control signal from the ECC 100.

The exhaust device 40 includes exhaust ports 41, exhaust valves 42 and an exhaust camshaft 43. The exhaust ports 41 are formed in the cylinder head 13 so as to communicate with the corresponding combustion chambers 23. The exhaust valves 42 open or close the corresponding exhaust ports 41. The exhaust camshaft 43 drives the exhaust valves 42.

In addition, the exhaust device 40 includes an exhaust manifold 45, an exhaust pipe 46, a first catalyst 47 and a second catalyst 48. The exhaust-manifold 45 has exhaust branch pipe portions (not shown in detail) connected to the exhaust ports 41 of the cylinders 21. The exhaust pipe 46 is connected to a collecting pipe portion 45a of the exhaust manifold 45. The first catalyst 47, such as a three-way catalyst, is arranged in an exhaust passage 46a of the exhaust pipe 46. The second catalyst 48, such as a three-way catalyst, is arranged in the exhaust pipe 46 at a portion downstream of the first catalyst 47.

The EGR device 50 includes an EGR passage 51 (exhaust gas return passage) and an EGR valve 52 (exhaust gas return control valve). The EGR passage 51 is able to return exhaust gas (emission gas) of the engine 10 from the exhaust passage 45b to the intake passage 35a. The EGR valve 52 is provided in the EGR passage 51. The EGR valve 52 is able to open or close the EGR passage 51 in accordance with a control signal from the ECC 100 and adjustably change the valve opening degree at the time when the EGR valve 52 is open.

Although not shown in detail in the drawing, the EGR passage 51 is, for example, formed of an EGR pipe or part of the exhaust manifold 45, and connects the exhaust passage 45b in the exhaust manifold 45 to an extended passage portion 39b in a surge tank 39 downstream of the throttle valve 37 within the intake passage 35a inside the intake manifold 35.

The EGR valve 52 is able to change its valve opening degree in response to an opening degree control signal Aev input thereto so as to variably control an EGR rate (exhaust gas return rate=returning exhaust gas flow rate/total intake air flow rate (including fresh air intake amount and exhaust gas recirculation amount)) that indicates an exhaust gas return amount (recirculation flow rate) through the EGR passage 51. The EGR device 50 further includes an EGR cooler 53. The EGR cooler 53 forms part of the EGR passage 51 on the exhaust passage 45b side with respect to the EGR valve 52, and is able to cool returning exhaust gas passing through the EGR passage 51. The EGR cooler 53 cools returning exhaust gas passing through the EGR passage 51 by exchanging heat with coolant of the engine 10.

The engine 10 is equipped with various sensors and actuators.

Specifically, an air flow meter 61 (intake air flow rate sensor), a throttle opening degree sensor 62 and a cam angle sensor 63 are arranged in an intake system of the engine 10. A crank angle sensor 64 and a coolant temperature sensor 65 are provided inside the body block 20 of the engine 10. An upstream-side air-fuel ratio sensor 66 and a downstream-side air-fuel ratio sensor 67 are provided in an exhaust system of the engine 10. The upstream-side air-fuel ratio sensor 66 is located near an exhaust gas inlet of the first catalyst 47. The downstream-side air-fuel ratio sensor 67 is located near an exhaust gas outlet of the first catalyst 47. Furthermore, an accelerator operation amount sensor 68 is provided in a vehicle on which the engine 10 is mounted. The accelerator operation amount sensor 68 detects an operating position of an accelerator pedal (not shown). A high-pressure fuel pressure sensor 69 is provided so as to detect a fuel pressure in the high-pressure delivery pipe.

The air flow meter 61 detects a flow rate Qa of air that is taken into the intake passage 35a by the intake device 30. The throttle opening degree sensor 62 detects an opening degree Tha of the throttle valve 37. The cam angle sensor 63, for example, generates a pulse signal by detecting a rotation of the intake camshaft at intervals of a predetermined rotation angle of the intake camshaft (for example, 90°=half of the rotation angle of the crankshaft 27, that is 180°). The crank angle sensor 64 is able to detect a crank angle position and an engine rotation speed Ne by, for example, outputting a signal having a narrow pulse for each rotation of the crankshaft 27 by 10° and a wide pulse for each rotation of the crankshaft 27 by 360°. The coolant temperature sensor 65 outputs a signal indicating a coolant temperature Tw by detecting the temperature of coolant passing through a water jacket 11w of the body block 20. The upstream-side air-fuel ratio sensor 66 detects an exhaust air-fuel ratio at the inlet side of the first catalyst 47. The downstream-side air-fuel ratio sensor 67 detects an exhaust oxygen concentration at a location between the first catalyst 47 and the second catalyst 48.

These sensors are connected to an input interface circuit of the ECC 100.

In addition to the injector driver circuit 18, the throttle motor 37b, the EGR valve 52 (electromagnetic driving portion), a fuel pump driving circuit 71 that drives the fuel feed pump, a driving circuit for an oil control valve 72 (an electromagnetic control valve that controls VVT that is activated through oil supply/drain control; hereinafter, referred to as OCV) that controls the intake-side VVT 33, and the like, are electrically connected to an output interface circuit of the ECC 100. However, the configurations of these components are similar to those in the existing art, so the detailed description is not provided here.

Although the detailed hardware configuration is not shown in the drawing, the ECC 100 includes a central processing unit (CPU), a read only memory (ROM), a random access memory (RAM) and a backup memory (which may be a nonvolatile memory), and further includes the input interface circuit including an A/D converter, and the like, the output interface circuit including drivers and relay switches, a constant voltage circuit and a communication interface circuit for communication with another in-vehicle electronic control unit (ECU).

In addition to the above-described sensors, an ignition relay switch (not shown), an ECT select switch (not shown), and the like, are connected to the input interface circuit of the ECC 100. Another ECU, such as a transmission control computer (TCC), is connected to a communication port (not shown) of the ECC 100.

The ECC 100 controls the engine 10 in accordance with a plurality of control programs prestored in the ROM on the basis of sensor information or storage information stored in the ROM or the backup memory and further through communication with another in-vehicle ECU.

The ECC 100 exercises the function of an EGR control unit and the function of a fuel injection control unit. The EGR control unit executes open/close control over the EGR valve 52 on the basis of the operating state of the engine 10. The fuel injection control unit activates at least one set of the port injection injectors 16 and the in-cylinder direct injection injectors 17 on the basis of the operating state of the engine 10, and carries out at least one of port injection and in-cylinder direct injection.

For example, the ECC 100 is able to exercise a plurality of functions for injection distribution control (described later) by calculating a fuel injection amount based on the operating state of the engine 10, an acceleration request, and the like, and timely outputting a command signal to the injector driver circuit 18 that drives the port injection injectors 16 and the in-cylinder direct injection injectors 17. In addition, the ECC 100 exercises the function of controlling the pressure of fuel, which is supplied from the high-pressure fuel pump to the high-pressure delivery pipe, to an optimal fuel pressure on the basis of the operating state of the engine 10 and the injection characteristic of the in-cylinder direct injection injectors 17 (the in-cylinder direct injection injectors #1 to #4 in FIG. 2).

Specifically, the ECC 100 that serves as the EGR control unit incorporates a map M1 for executing EGR control on the basis of the operating state of the engine 10. In the map M1, an EGR non-operation region Ra in which the EGR valve 52 is closed and an EGR operation region Rb in which the EGR valve 52 is opened are set within an operation range of the engine 10.

Here, the EGR non-operation region Ra is, for example, set to an operation region in which any one of a condition that the coolant temperature Tw is lower than or equal to a predetermined temperature, a condition that the engine 10 is operated at an idle where a load factor is lower than a predetermined load factor, a condition that a predetermined period of time has not elapsed from an engine start, a condition that the engine 10 is racing (in a state where there is no load and the engine rotation speed Ne exceeds a predetermined value), and the like, is satisfied. On the other hand, the EGR operation region Rb is set over a wide range within a load operation range in which the load factor of the engine 10 exceeds the predetermined load factor in an operation region other than the EGR non-operation region Ra. The predetermined load factor here is an injection distribution permissible load factor KL1 (predetermined load factor) that is a threshold for determining whether to permit in-cylinder direct injection and port injection or a load factor close to the injection distribution permissible load factor KL1.

Thus, the EGR non-operation region Ra includes an operation region in which the engine 10 is operated at a low load and low rotation speed, the amount of fresh air and the amount of fuel, introduced into each cylinder 21, are small and a combustion state easily becomes unstable through introduction of EGR gas. The EGR operation region Rb, for example, includes an operation region in which a combustion state is stable, like an operation region in which the engine 10 is operated at a relatively high load and high rotation speed, and it is possible to expect reduction in NOx and improvement in output power through introduction of sufficient EGR gas.

The ECC 100 that serves as the EGR control unit determines whether the operating state of the engine 10 is the EGR non-operation region Ra or the EGR operation region Rb on the basis of the sensor information, such as the throttle opening degree Tha, the intake air amount Qa, the engine rotation speed Ne and the coolant temperature Tw. When the ECC 100 determines that the operating state of the engine 10 falls within the EGR operation region Rb, the ECC 100 opens the EGR valve 52 to return part of exhaust gas (emission gas) of the engine 10 from the exhaust passage 45b to the intake passage 35a through the EGR passage 51.

Figure 3:
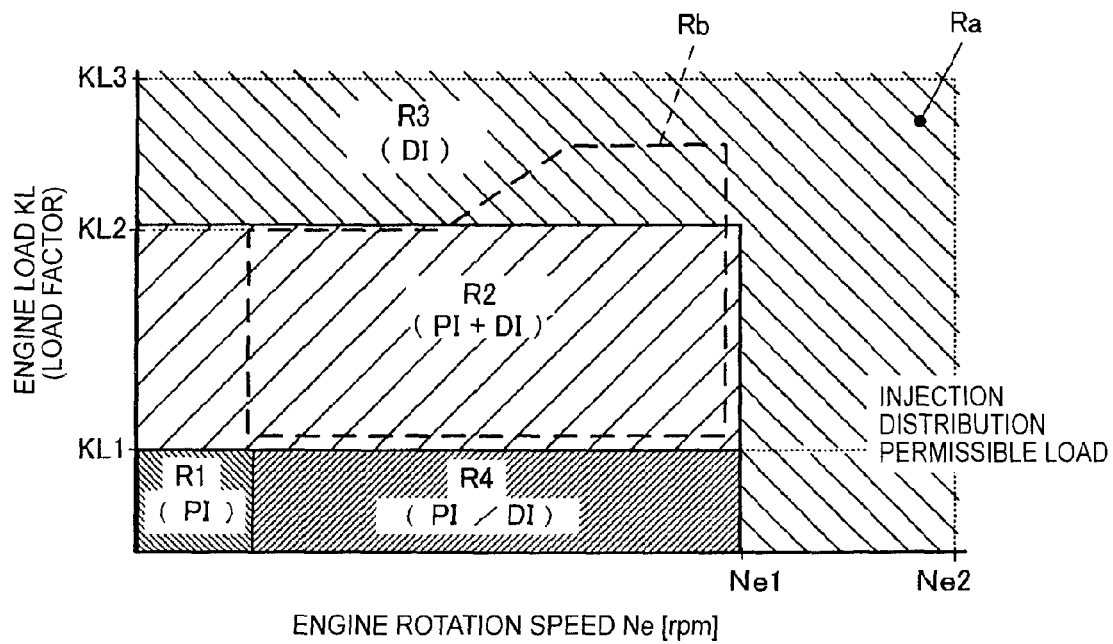
FIG. 3 is a graph that illustrates an operation range of the internal combustion engine according to the embodiment of the invention and an EGR operation region, an EGR non-operation in-cylinder direct injection region, an EGR non-operation injection distribution region and an EGR operation injection distribution region that are set within the operation range, in which the ordinate axis represents load factor and the abscissa axis represents engine rotation speed Ne.

On the other hand, the ECC 100 that serves as the fuel injection control unit incorporates a map M2 (see FIG. 2) in which the operation region of the engine 10 is partitioned into four' operation regions R1, R2, R3, R4 shown in FIG. 3. The ECC 100 determines a fuel injection condition corresponding to the operating state of the engine 10 on the basis of the map M2, and generates a command signal to the injector driver circuit 18.

In FIG. 3, the operation range of the engine 10 is represented by an engine load, for example, a load factor KL at the ordinate axis and an engine rotation speed Ne at the abscissa axis. The low-load and low-engine rotation speed operation region R1 in FIG. 3 is a port injection operation region in which only port injection ((PI) in the graph) is carried out. The operation region R2 in which the load factor is higher than or equal to 10, the injection distribution permissible load factor KL1 and lower than or equal to a predetermined load factor KL2 in the graph and the rotation speed does not fall within an extremely high engine rotation speed range in the graph is an injection distribution operation region in which mixed injection ((PI+DI) in the graph) that uses both port injection and in-cylinder direct injection is carried out in an injection distribution condition based on the operating state of the engine 10. The injection distribution operation region R2 may be extended to an operation region in which the load is higher than that in a low engine rotation speed range corresponding to the port injection operation region R1.

The operation region R3 on the high load or on the high engine rotation speed side with respect to the injection distribution operation region R2 in FIG. 3 is an in-cylinder direct injection operation region in which only in-cylinder direct injection ((DI) in the graph) is carried out.

The in-cylinder direct injection operation region R3 is an EGR non-operation in-cylinder direct injection region in which only in-cylinder direct injection is carried out while port injection is stopped in a state where the EGR valve 52 is closed within the operation range of the engine 10, which is defined by the engine rotation speed Ne and the engine load (load factor) KL. The EGR non-operation in-cylinder direct injection region R3 is an operation region in which port injection is not carried out when external EGR is not introduced by the EGR device 50, and includes a predetermined operation region, such as a range in which the load factor KL ranges from KL2 to KL3 (for example, from 40 to 60%) and a range in which the engine rotation speed Ne ranges from Ne1 to Ne2 (for example, from 2800 to 4000 [rpm]) in FIG. 3.

The operation region R4 located on the low load side of the injection distribution operation region R2 in the graph is a selective injection operation region in which one of port injection and in-cylinder direct injection ((PI/DI) in the graph), selected on the basis of the operating state of the engine 10, is carried out.

The ECC 100 that serves as the fuel injection control unit causes the port injection injectors 16 (the port injection injectors #1 to #4 in FIG. 2) to carry out fuel injection at the time of a cold start of the engine 10 in accordance with the control programs stored in the ROM, and, when the fuel pressure in the high-pressure delivery pipe has exceeded a predetermined pressure value, starts outputting an injection command signal to the in-cylinder direct injection injectors 17.

Figure 4:
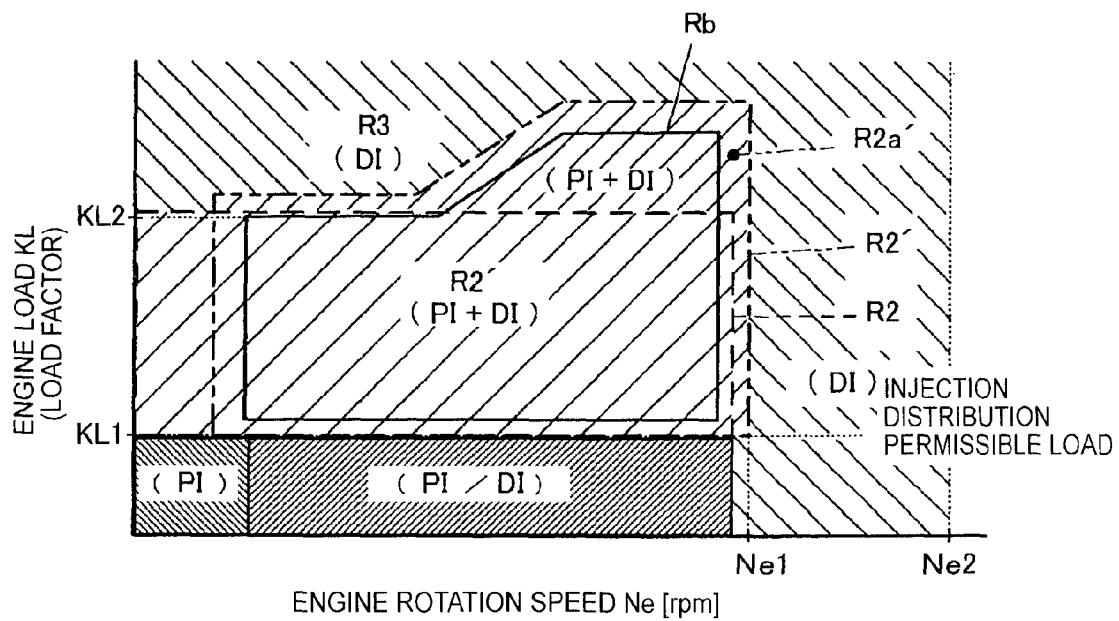
FIG. 4 is a graph that illustrates the operation range of the internal combustion engine according to the embodiment of the invention and the EGR operation region, the EGR non-operation in-cylinder direct injection region, the EGR non-operation injection distribution region and the EGR operation injection distribution region that are set within the operation range, in which the ordinate axis represents load factor and the abscissa axis represents engine rotation speed Ne.

As shown in FIG. 4, the ECC 100 that serves as the fuel injection control unit has a map M3 in which part R2a' of an EGR operation injection distribution region R2' in which in-cylinder direct injection and port injection are carried out in a state where the EGR valve 52 is open is set within the in-cylinder direct injection operation region R3 that is the EGR non-operation in-cylinder direct injection region.

Here, the EGR operation injection distribution region R2' is set so as to be extended to a side at which the load factor KL and the engine rotation speed Ne increase with respect to the EGR non-operation injection distribution operation region R2 such that the part R2a' enters the in-cylinder direct injection operation region R3. The EGR operation injection distribution region R2' is an EGR operation port injection permissible region in which at least port injection is carried out in a state where the EGR valve 52 is open, and at least the part R2a' enters the predetermined operation region.

The EGR operation injection distribution region R2' is set such that at least one of the load factor KL of the engine 10 and the engine rotation speed Ne of the engine 10 reaches a wider range than that in the EGR operation region Ra, and is, for example, set as an operation region that includes the EGR operation region Rb as shown in FIG. 4.

When the engine 10 is in the operating state within the EGR operation injection distribution region R2', the ECC 100 causes the port injection injectors 16 and the in-cylinder direct injection injectors 17 to carry out mixed injection ((PI+DI) in the graph) on the injection distribution condition based on the operating state of the engine 10. However, when the engine 10 is in the operating state within the part R2a' of the EGR operation injection distribution region R2' extended with respect to the EGR non-operation injection distribution operation region R2, the ECC 100 limits the lower limit value of the fuel injection amount through port injection from the port injection injectors 16 to a preset lower limit injection amount.

The injection distribution condition based on the operating state of the engine 10 here is, for example, a condition corresponding to an in-cylinder direct injection rate Kdi set on the basis of the engine rotation speed Ne, the coolant temperature Tw and an in-cylinder intake air amount Mc (described later). The injection distribution condition is preset as an injection distribution condition map M4 (see FIG. 2), and is stored in the ROM or the backup memory of the ECC 100.

Of course, the ECC 100 also has the function of executing known air-fuel ratio feedback control and sub-feedback control.

Next, the operation of the present embodiment will be described.

FIG. 5 shows the flow of an injection amount calculation process that is repeatedly executed by the ECC 100 during operation of the engine 10. The process is started each time the crank angle of any one of the cylinders becomes a predetermined crank angle, for example, BTDC 90° CA, before intake stroke.

In the flowchart, initially, the in-cylinder intake air amount Mc that is taken into the combustion chamber 23 in the current intake stroke is calculated on the basis of the intake air amount Qa and the engine rotation speed Ne (step S11), and a basic fuel injection amount Fbase for bringing a combustion air-fuel ratio to a target air-fuel ratio, for example, a stoichiometric air-fuel ratio AFth, is calculated on the basis of the in-cylinder intake air amount Mc and the target air-fuel ratio AFth (step S12). Then, an injection amount Fi obtained by adding various known correction amounts Dfi to the basic fuel injection amount Fbase is set (step S13).

Subsequently, a load factor KL (the rate (%) of an actual intake air amount to a reference maximum intake air amount per one rotation of the engine 10) is calculated on the basis of the calculated in-cylinder intake air amount Mc, it is determined which one of the operation regions determined by the maps M2, M3 the current operating state of the engine 10 belongs to (step S14), and it is determined which injection mode is selected, in-cylinder direct injection (DI), port injection (PI) or mixed injection (PI+DI) (step S15, step S16).

When the in-cylinder direct injection mode in which only the in-cylinder direct injection (DI) is carried out is selected (YES in step S15), the rate of the fuel injection amount at the in-cylinder direct injection injectors 17 with respect to the total fuel injection amount Fi (hereinafter, referred to as in-cylinder direct injection rate) Kdi is set to "1" (step S17). On the other hand, when the port injection mode in which only the port injection (PI) is carried out is selected (YES in step S16), the in-cylinder direct injection rate Kdi is set to "0" (step S18). When the injection mode of the mixed injection (PI+DI) in which both the in-cylinder direct injection (DI) and the port injection (PI) are used is selected (NO in step S16), the in-cylinder direct injection rate Kdi is set by consulting the injection distribution condition map M4 on the basis of the in-cylinder intake air amount Mc, the engine rotation speed Ne, the coolant temperature Tw, and the like (step S19).

Subsequently, an in-cylinder injection amount Fid is calculated by multiplying the above-described total fuel injection amount Fi by the in-cylinder direct injection rate Kdi (step S20), and a port injection amount Fip is calculated by multiplying the total fuel injection amount Fi by (1−Kdi) (step S21).

The ECC 100 outputs the thus calculated in-cylinder injection amount Fid and port injection amount Fip to the injector driver circuit 18. Furthermore, the ECC 100 outputs a command signal to the injector driver circuit 18 for a poll injection period and an in-cylinder direct injection period calculated on the basis of information detected by the cam angle sensor 63 and the crank angle sensor 64. Fuel injection is timely carried out by each of the injectors 16, 17 in the following manner. The injector driver circuit 18 respectively outputs injection drive signals corresponding to the in-cylinder injection amount Fid and the port injection amount Fip to the four port injection injectors 16 and the four in-cylinder direct injection injectors 17 for the number of cylinders of the engine 10 during corresponding injection periods.

On the other hand, the ECC 100 that serves as the EGR control unit determines whether the operating state of the engine 10 falls within the EGR non-operation region Ra or the EGR operation region Rb on the basis of the sensor information, such as the throttle opening degree Tha, the intake air amount Qa, the engine rotation speed Ne and the coolant temperature Tw. When it is determined that the operating state of the engine 10 falls within the EGR operation region Rb, the EGR valve 52 is opened.

At this time, part of exhaust gas (emission gas) of the engine 10 returns from the exhaust passage 45b to the intake passage 35a through the EGR passage 51. Thus, exhaust gas is recirculated. As a result, for example, NOx in exhaust gas of the engine 10 is reduced.

Incidentally, in the above-described operation region determination step S14, the operating state of the engine 10 is determined on the basis of the map M2 during EGR operation and on the basis of the map M3 during EGR non-operation. That is, during EGR operation, it is determined within which region the operating state of the engine 10 falls, the port injection operation region R1, the injection distribution operation region R2 of mixed injection, the in-cylinder direct injection operation region R3 or the selective injection operation region R4. In addition, during EGR non-operation, it is determined whether the operating state of the engine 10 falls within the injection distribution operation region R2' of mixed injection.

The maps M2, M3 are separately used by executing a map selecting process shown in FIG. 6.

In FIG. 6, initially, various pieces of sensor information, indicating the operating state of the engine 10, are acquired, and the operating state of the engine 10 is detected (step S31).

Subsequently, it is determined whether the operating state of the engine 10 falls within the EGR operation region Rb and the EGR operation condition is satisfied on the basis of the sensor information, such as the throttle opening degree Tha, the intake air amount Qa, the engine rotation speed Ne and the coolant temperature Tw (step S32).

At this time, when the EGR operation condition is satisfied (YES in step S32), the map M3 extended from the injection distribution region of mixed injection is used (step S33). On the other hand, at this time, when the EGR operation condition is not satisfied (NO in step S32), the map M2 in which the injection distribution region of mixed injection is set to a non-extended normal region is used (step S34).

When the operating state of the engine 10 falls within the extended EGR operation injection distribution region R2', and at least falls within an operating state in the part R2a' of the EGR operation injection distribution region R2', which is the extended part, a port injection amount limiting process shown in FIG. 7 is executed.

In FIG. 7, initially, various pieces of sensor information are acquired and the operating state of the engine 10 is detected, and then the port injection amount Fip calculated in the above-described injection amount calculation process is loaded from the RAM (step S41).

Subsequently, it is determined whether the operating state of the engine 10 falls within the EGR operation region Rb and the EGR operation condition is satisfied on the basis of the throttle opening degree Tha, the intake air amount Qa, the engine rotation speed Ne, the coolant temperature Tw, and the like (step S42).

At this time, when the EGR operation condition is not satisfied (NO in step S42), the current process ends.

On the other hand, at this time, when the EGR operation condition is satisfied (YES in step S42), a port injection amount lower limit value Fip_min is set (step S43). The port injection amount lower limit value Fip_min may be variably set on the basis of, for example, an intake air temperature, the coolant temperature Tw and another operating state or may be preset as a fixed value.

Subsequently, it is checked whether the calculated port injection amount Fip is larger than or equal to the port injection amount lower limit value Fip_min (step S44).

At this time, for example, if an injection amount calculation process substantially similar to that during EGR non-operation is executed also during EGR operation, when the operating state of the engine 10 falls within the part R2a' of the EGR operation injection distribution region R2' extended to enter the EGR non-operation in-cylinder direct injection region R3, the calculated port injection amount Fip can be relatively small. In this case, there is a possibility that the calculated port injection amount Fip does not reach the port injection amount lower limit value Fip_min or above (NO in step S44); however, in the present embodiment, the calculated port injection amount Fip is set to the port injection amount lower limit value Fip_min or above (step S45). Thus, the port injection amount that is necessary and sufficient to provide a state where a deposit is hard to be produced at the injection holes of the port injection injectors 16 is ensured.

In the present embodiment in which the above-described processes are executed, it is now assumed that the engine 10 that had been operated within the EGR non-operation in-cylinder direct injection region R3 has shifted into the EGR operation state.

In the present embodiment, the part R2a' of the EGR operation injection distribution region R2' is set so as to be extended into the EGR non-operation in-cylinder direct injection region R3, so, at this time, fuel injection is carried out with the use of the port injection injectors 16 at the timing at which the operating state of the engine 10 enters the operation range of the part R2a' of the EGR operation injection distribution region R2'.

Thus, portions around the injection holes of the port injection injectors 16 are adequately cooled by port-injected fuel, and the temperature around the injection holes is hard to rise. As a result, occurrence of a state where a deposit is easily produced at the injection holes of the port injection injectors 16 is effectively suppressed.

In the present embodiment, the EGR operation region Rb in which the EGR valve 52 is opened and the EGR non-operation region Ra in which the EGR valve 52 is closed are set within the operation range of the engine 10, and the EGR operation injection distribution region R2' is set such that at least one of the load factor KL of the engine 10 and the engine rotation speed Ne of the engine 10 reaches a wider range than that in the EGR operation region Rb. Thus, when the engine 10 shifts into the EGR operation state, the operating state of the engine 10 early easily enters the EGR operation injection distribution region R2', and fuel injection is more early carried out with the use of the port injection injectors 16.

Particularly, in the present embodiment, the EGR operation injection distribution region R2' is set as an operation region that includes the EGR operation region Rb, so, when the engine 10 shifts into the EGR operation state, the operating state of the engine 10 reliably and early enters the EGR operation injection distribution region R2'. In addition, in-cylinder direct injection continues before and after shifting into the EGR operation state, so it is not required to significantly change the fuel injection state, and a variation in the operating state of the internal combustion engine due to a change of the injection condition is suppressed.

In addition, in the present embodiment, the lower limit value of the fuel injection amount Fip through port injection in the part R2a' of the EGR operation injection distribution region R2' is limited to the preset lower limit injection amount Fip_min, so it is possible to sufficiently ensure the effect of suppressing formation of a deposit by setting the port injection amount Fip in the par R2a' of the EGR operation injection distribution region R2' to the minimum injection amount Fip_min or above. It is possible to cool the injection holes of the port injection injectors 16 at or above the minimum injection amount Fip_min.

Within the operation range of the engine 10, the part R2a' of the EGR operation injection distribution region R2' is set so as to extend from the EGR non-operation injection distribution region R2 side to the EGR non-operation in-cylinder direct injection region R3 side. Therefore, it is possible to extend the injection distribution region only for a range effective to avoid a state where a deposit is easily produced at the injection holes of the port injection injectors 16 during EGR operation, so it is possible to suppress a variation in the operating state of the engine 10 due to a change of the injection distribution region.

Furthermore, the EGR operation region Rb is set within a load operation range that exceeds the predetermined injection distribution permissible load factor KL1 of the engine 10 at or below which in-cylinder direct injection and port injection are permitted to be carried out. Therefore, the EGR operation injection distribution region R2' that reaches a wider range than the EGR operation region Rb can be set, and port injection can be reliably carried out during EGR operation, so it is possible to effectively suppress occurrence of a state where a deposit is easily produced at the injection holes of the port injection injectors 16.

As described above, according to the present embodiment, even when the engine 10 that has been operated within the EGR non-operation in-cylinder direct injection region R3 shifts into the EGR operation state, but when the operating state of the engine 10 enters the operation range of part of the EGR operation injection distribution region R2', it is possible to adequately cool portions around the injection holes of the port injection injectors 16 by causing the port injection injectors 16 to carry out fuel injection. As a result, it is possible to effectively suppress formation of a deposit at the injection holes of the port injection injectors 16 by making the temperature around the injection holes of the port injection injectors 16 hard to rise.

In the above-described embodiment, the port injection amount lower limit value Fip_min is set; however, it is conceivable to suppress undue port injection by setting an upper limit value of the port injection amount.

As described above, the invention is able to adequately cool a portion around an injection hole of a port injection injector with the use of fuel during EGR operation, and is able to effectively suppress formation of a deposit at the injection hole of the port injection injector by making the temperature around the injection hole of the port injection injector hard to rise. The thus configured invention is useful in a general control device for a dual-injection internal combustion engine in which a port injection injector and an in-cylinder direct injection injector are provided together.

The invention claimed is:

1. A control device for an internal combustion engine, the internal combustion engine including: an exhaust passage; an intake passage; an EGR passage that connects the exhaust passage to the intake passage; an EGR valve that opens or closes the EGR passage; a port injection injector that carries out port injection in which fuel is injected into the intake passage; and an in-cylinder direct injection injector that carries out in-cylinder direct injection in which fuel is directly injected into a cylinder of the internal combustion engine, the control device comprising:
    an EGR control unit configured to execute open/close control over the EGR valve on the basis of an operating state of the internal combustion engine; and
    a fuel injection control unit configured to carry out at least one of the port injection and the in-cylinder direct injection by operating at least one of the port injection injector and the in-cylinder direct injection injector on the basis of the operating state of the internal combustion engine, wherein
    the fuel injection control unit is configured to set an EGR non-operation in-cylinder direct injection region, in which the port injection is stopped and the in-cylinder direct injection is carried out in a state where the EGR valve is closed when an EGR operation condition is not satisfied, within an operation range of the internal combustion engine, and to set part of an EGR operation port injection permissible region, in which at least the port injection is carried out in a state where the EGR valve is open when the EGR operation condition is satisfied, within the EGR non-operation in-cylinder direct injection region.

2. The control device according to claim 1, wherein the EGR control unit is configured to set an EGR operation region in which the EGR valve is open and an EGR non-operation region in which the EGR valve is closed within the operation range of the internal combustion engine, and the fuel injection control unit is configured to set the EGR operation port injection permissible region such that at least one of a load factor of the internal combustion engine and an engine rotation speed of the internal combustion engine reaches a wider range than that in the EGR operation region.

3. The control device according to claim 2, wherein the fuel injection control unit is configured to set the EGR operation port injection permissible region as an operation region that includes the EGR operation region.

4. The control device according to claim 2, wherein the EGR control unit is configured to set the EGR operation region within a load operation range that exceeds a predetermined load factor of the internal combustion engine at or below which the in-cylinder direct injection and the port injection are permitted to be carried out.

5. The control device according claim 1, wherein the EGR operation port injection permissible region is an EGR operation injection distribution region in which the port injection and the in-cylinder direct injection are carried out in the state where the EGR valve is open.

6. The control device according to claim 5, wherein the fuel injection control unit is configured to limit a lower limit value of a fuel injection amount through the port injection in part of the EGR operation injection distribution region to a preset lower limit injection amount.

7. The control device according to claim 5, wherein the fuel injection control unit is configured to set an EGR non-operation injection distribution region, in which the in-cylinder direct injection and the port injection are carried out in the state where the EGR valve is closed, within the operation range of the internal combustion engine in addition to the EGR operation injection distribution region and the EGR non-operation in-cylinder direct injection region, and to set part of the EGR operation injection distribution region such that the part of the EGR operation injection distribution region is extended from the EGR non-operation injection distribution region side to the EGR non-operation in-cylinder direct injection region side.

8. A control method for an internal combustion engine, the internal combustion engine including: an exhaust passage; an intake passage; an EGR passage that connects the exhaust passage to the intake passage; an EGR valve that opens or closes the EGR passage; a port injection injector that carries out port injection in which fuel is injected into the intake passage; and an in-cylinder direct injection injector that carries out in-cylinder direct injection in which fuel is directly injected into a cylinder of the internal combustion engine, the control method comprising:
    setting an EGR non-operation in-cylinder direct injection region, in which the port injection is stopped and the in-cylinder direct injection is carried out in a state where the EGR valve is closed when an EGR operation condition is not satisfied, within an operation range of the internal combustion engine, and setting part of an EGR operation port injection permissible region, in which at least the port injection is carried out in a state where the EGR valve is open when the EGR operation condition is satisfied, within the EGR non-operation in-cylinder direct injection region.

* * * * *